United States Patent Office 2,749,842
Patented June 12, 1956

2,749,842

PUMP BEARING LUBRICATING AND SPEED CONTROL SYSTEM

Pierce T. Angell and Robert Cliborn, Euclid, Ohio, assignors to Thompson Products, Inc., Cleveland, Ohio, a corporation of Ohio Application March 3, 1951, Serial No. 213,712

14 Claims. (Cl. 103—17)

This invention relates generally to a pump assembly of the type having a pump impeller and a driving means such as a turbine wheel mounted on a common shaft and more particularly to an improved lubricating arrangement for such a pump, which lubricating arrangement includes elements which develop a dual function in producing a control signal for a speed control system associated with the pump assembly.

According to the general features of the present invention, a housing having a hollow bore extending therethrough is provided in which a shaft having a pump impeller at one end and a turbine wheel at the other end may be rotated. A first seal is located between the impeller end of the shaft and the housing and a second seal is located between the wheel end of the shaft and the housing, there being a pair of spaced apart bearings in the housing between the first and second seals and arranged to journal the shaft for rotation. Each of the bearings is preferably of the thrust type, having angularly disposed raceways cooperable with shiftable ball elements arranged to resist axial and radial forces, and a resilient spring is provided to pre-load the bearing axially.

A spacer ring is located between the bearings and forms together with the shaft a restricted passageway. A filling inlet is provided in the housing so that the hollow bore may be packed with lubricant, the circulation flow thereof between the bearings being responsive to the rotational speed of the shaft.

The spacer ring includes an annular recess having magnetic field producing means associated therewith and arranged to establish a magnetic field in at least a portion of the recess. A boss is co-rotatably carried by the shaft for movement through the field and produces a signal responsive to the rotational speed of the shaft. Control means are provided to regulate the speed of the turbine wheel in response to variations in the signal. The boss not only performs the signal producing function set forth, but, in addition, acts as an impeller to assist the circulation of lubricant through the restricted flow passageway toward each of the bearings.

It is an object of the present invention to provide a pump assembly which may be pre-packed with a lubricant and in which the movement of the lubricant may be controlled as a function of the speed of the rotating parts of the pump assembly.

Another object of the present invention is to provide an improved lubrication arrangement for a pump assembly whereby a continuous circulation of lubricant may be produced through the bearing elements associated with the pump shaft.

A further object of the present invention is to provide a pump assembly having an improved structural disposition of components comprising a reduced number of simplified members which may be conveniently assembled with one another and by means of which the pump assembly may be serviced without requiring a complete disassembly.

A still further object of the present invention is to provide a pump assembly having a lubricating arrangement including elements performing a dual function of assisting in the lubrication flow throughout the pump and generating a signal for a speed control device for the pump.

Many other features, advantages and additional objects of the present invention will become manifest to those versed in the art upon making reference to the detailed description which follows and the accompanying sheets of drawings upon which a preferred embodiment of a pump assembly incorporating the principles of the present invention is shown.

On the drawings:

Figure 3 is an elevational view of a spring employed in the pump assembly for pre-loading purposes and Figure 4 is a cross-sectional view of the spring shown in Figure 3.

As shown on the drawings:

Figure 1:
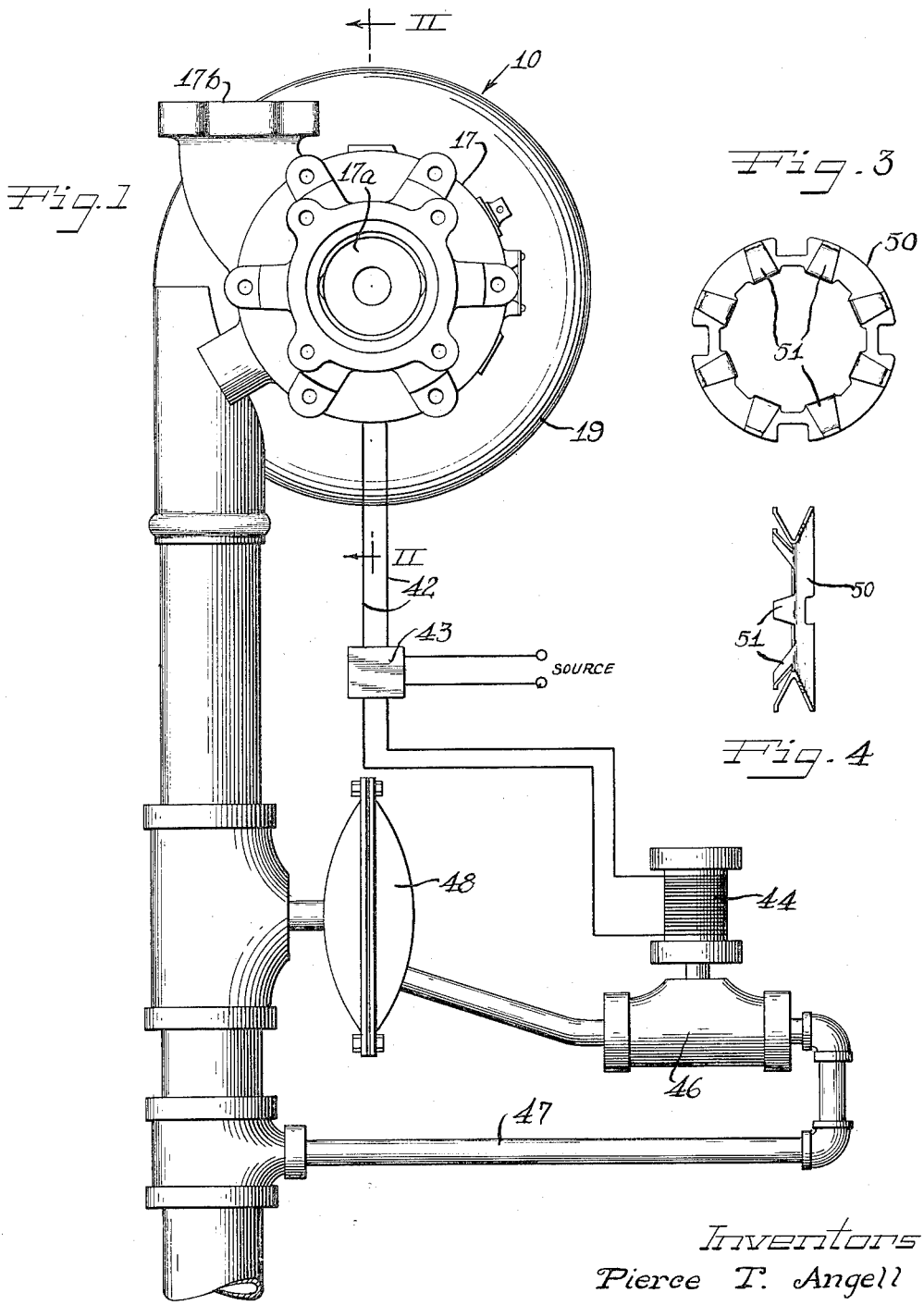
Figure 1 is a somewhat diagrammatic view showing a pump assembly according to the principles of the present invention associated with a speed control system.

The pumping assembly of the present invention is indicated generally by the reference numeral 10 and includes a housing 11 having a hollow bore 12 extending therethrough.

The bore 12 is of irregular configuration, being formed with various recessed portions of different diameter to accommodate interrelated components of the pumping assembly.

A shaft 13 extends through the bore 12 and a pump impeller 14 is firmly connected thereto at one end while a turbine wheel 16 is firmly connected thereto at the other end.

A pump diffuser case 17 encloses the pump impeller 14 as well as the impeller end of the housing 11 and a first seal mechanism indicated generally by the reference numeral 18 is provided between the shaft 13 and the bore 12 of the housing 11 at the impeller end of the shaft 13. The first seal mechanism 18 preferably takes the form of the sealing structure more particularly described and claimed in the copending application of Robert Cliborn entitled "Seal," U. S. Serial No. 188,424, filed October 4, 1950, now Patent No. 2,662,480.

The case 17 provides an inlet 17a and an outlet 17b for the impeller 14.

A collector housing 19 and a nozzle ring 20 substantially enclose the other end of the housing 11, the nozzle ring 20 being provided with a plurality of radially inwardly directed nozzle inlets 21 arranged to direct a fluid toward the vanes of the turbine wheel 16 drivingly keyed to the shaft 13 as at 22.

A seal bushing 23 is interposed between the nozzle ring 20 and the shaft 13 to establish a second seal at the wheel end of the shaft 13. The bushing 23 is preferably made of a porous material which is suitably pre-packed with a lubricant such as grease.

A ring-like cap member 24 is firmly connected to the nozzle ring 20 and together with a concentrically disposed ring retainer 26 holds the bushing 23 in proper radial alignment.

A pair of spaced bearings 27 and 28 are spaced apart from one another in the housing 11 within the bore 12 and journal the shaft 13 for rotation. Each of the bearings 27 and 28, respectively, are of the thrust type, including angularly disposed outer raceways 27a and 28a cooperable with shiftable ball elements 29 arranged to resist axial as well as radial forces imparted thereto during the operation of the pump assembly 10. The shaft 13 is provided with an enlarged medial portion bounded by shoulders 30 and 31 which are arranged to engagingly abut the bearings 27 and 28, respectively.

A filling inlet 32 is formed in the nozzle ring 20 and communicates with the bore 12 through an annular passageway 33 at the end of the inlet 32. A radially extending recess 36 is provided in the bushing 23 so that a supply of lubricant may be packed into the bore 12 between the first sealing means 18 and the bushing 23. The lubricant preferably takes the form of a suitable quality thermotropic grease.

A spacer means is provided between the bearings 27 and 28 and in this preferred embodiment comprises a spacer ring 37 which together with the shaft 13 forms a restricted passageway 38. In the operation of the pump assembly 10, the action of the bearings 27 and 28 in the areas immediately adjacent either side thereof is such as to permit a circulation of lubricant between and through the bearings 27 and 28. Moreover, the flow circulation of the lubricant will be responsive to the heat generated by the bearings which, of course, is directly dependent upon the rotative speed of the shaft 13. As a result, the amount of lubricant reaching the friction surfaces will be increased as the rotational speed of the shaft 13 increases.

In order to retain the bearings 27 and 28 together with the spacer ring 37 in assembled relationship, a recess 49 is provided in the nozzle ring 20 to receive an annular spring member 50 comprising a resilient means to axially pre-load the bearing 28 in the direction of the bearing 27. As will be noted on Figures 3 and 4, the spring member 50 comprises an annular ring of metal stamped out to provide a plurality of radially spaced apart tabs 51 which are bent back upon the main body portion of the spring member 50. The tabs 51 together with the main body portion of the spring member 50 form a V-shaped recess, the most divergent part of the recess being formed by the ends of the tabs 51.

To assist in the circulation flow of the lubricant packed within the bore 12 towards each of the bearings 27 and 28, the shaft 13 is provided with radially outwardly extending segmental boss projections 39 which are co-rotatable with the shaft 13 and which constitute impellers to assist in the circulation flow of the lubricant through the restricted passageway 38.

The projections 39 are preferably made of a magnetizable material, or in other words, a paramagnetic material, so that movement thereof through an annular recess 40 formed in the spacer ring 37 may develop an additional function with regard to a speed control mechanism about to be described.

Figure 2:
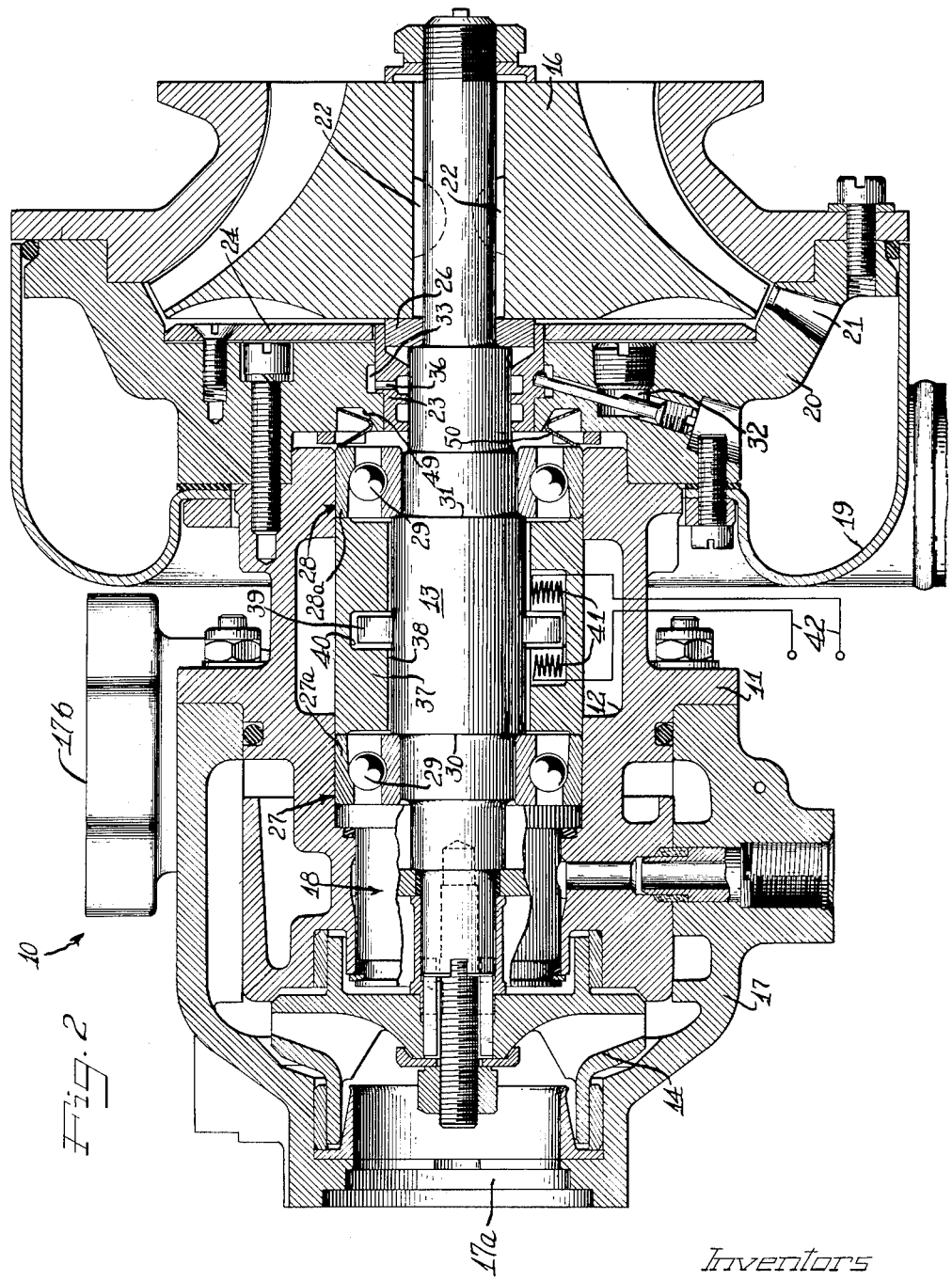
Figure 2 is an enlarged cross-sectional view with parts shown in elevation and with parts broken away for the sake of clarity taken substantially on line II—II of Figure 1.

It will be noted upon making reference to Figures 1 and 2 that a magnetic field producing means taking the form of a pair of coils 41, 41 is situated adjacent the recess 40 and the coils 41, 41 are arranged to establish a magnetic field in at least a portion of the recess 40.

Upon movement of the projections 39 through the field established by the coils 41, 41 a signal will be produced in the conductors 42 leading away from the coils 41, 41.

In order to utilize the signal thus produced, which signal will be responsive to the rotational speed of the shaft 13, the conductors 42 are led to a relay 43 in control of a solenoid 44 employed to regulate the opening and closing of an electrically controlled valve 46 interposed in an air line 47 and in control of the air flow through the air line 47.

By opening and closing the valve 46, air flow to a pressure sensitive control valve 48 is regulated, the pressure sensitive control valve 48 being in control of the supply of air delivered through the nozzle 21 to drive the turbine wheel 16 of the pump assembly 10.

The relay 43 is preferably associated with a source of electric current, for example the primary electric system of a vehicle with which the pumping assembly 10 may be associated, thereby to provide the current for operating the solenoid 44. Thus, the relay 43 will either energize or deenergize the solenoid 44, in response to variations in the signal transmitted thereto by the conductors 42, 42.

As a practical matter, it will be recognized that the speed control mechanism set forth herein finds its greatest practicability when employed as a limiting device so that once a limiting speed is reached, a sufficient signal voltage will be generated by the movement of the projections 39 relative to the coils 41 so that the electrically controlled valve 46 will be actuated to regulate the pressure sensitive valve 48, thereby to shut off or cut down the air supply to the turbine wheel 16.

After the turbine wheel 16 has reduced its speed, sufficient energy will be supplied to the relay 43 to again permit opening of the pressure sensitive valve 48.

It would, of course, be possible to substitute other control devices for those set forth merely by way of illustrative example. For example, the relay 43 could be replaced by an electric motor directly in control of a valve regulating the supply of air to the turbine wheel 16, so that a modulating control of the air supply to the turbine wheel 16 could be effected.

Various other minor structural modifications might also be suggested by those versed in the art, however, it should be understood that we do not wish to be limited to the precise structural embodiment herein described by way of illustrative example but wish to embody within the scope of this patent all such modifications as reasonably and properly come within the scope of our contribution to the art.

We claim as our invention:

1. A turbine pump assembly comprising a hollow casing, a pair of spaced apart bearings in said casing, a shaft journaled in said bearings, a pump impeller at one end of said shaft, a turbine wheel at the other end of said shaft to drive said impeller, seal means closing each end of said casing, a charge of lubricant prepacked in said casing, spacer means between said bearings forming together with said shaft a restricted flow path between said bearings, the circulation flow of lubricant through and between said bearings being responsive to the driving speed of said turbine wheel, said spacer means having an enlarged medial recess and said shaft having a boss extending into said recess and rotatable therein, said boss operative to assist in the circulation flow of lubricant toward said bearings.

2. In a pump assembly of the type having an impeller and a wheel co-rotatable with a common shaft, the improvement of a pump housing, a pair of spaced apart bearings in said housing, a shaft journaled in said bearings and adapted to carry the impeller and the wheel of the pump, spacer means between said bearings and forming together with said shaft a restricted passageway, closure means forming together with said shaft and said housing a casing to enclose said bearings and said spacer means, means providing an inlet in said housing to charge said casing with a thermotropic lubricant, the circulation flow of lubricant through and between said bearings being responsive to the driving speed of said turbine wheel, said spacer means having an enlarged medial recess and said shaft having a boss extending into said recess and rotatable therein, said boss operative to assist the circulation flow of lubricant toward said bearings.

3. In a pump assembly of the type having an impeller and a wheel co-rotatable with a common shaft, the improvement of a pump housing, a pair of spaced apart bearings in said housing, a shaft journaled in said bearings and adapted to carry the impeller and the wheel of the pump, spacer means between said bearings and forming together with said shaft a restricted passageway, closure means forming together with said shaft and said housing a casing to enclose said bearings and said spacer means, means providing an inlet in said housing to charge said casing with a thermotropic lubricant, the circulation flow of lubricant through and between said bearings being responsive to the driving speed of said turbine wheel, said spacer means having an enlarged medial recess, said shaft having a boss extending into said recess and rotatable therein, said boss operative to assist the circulation flow toward said bearings, said boss further constituting a paramagnetic material, magnetic field producing means adjacent said recess and conductor means to receive a signal upon rotation of said boss relative to said magnetic field producing means.

4. A turbine pump assembly comprising a hollow casing, a pair of spaced apart bearings in said casing, a shaft journaled in said bearings, a pump impeller at one end of said shaft, a turbine wheel at the other end of said shaft to drive said impeller, seal means closing each end of said casing, a charge of lubricant prepacked in said casing, spacer means between said bearings forming together with said shaft a restricted flow path between said bearings, the circulation flow of lubricant through and between said bearings being responsive to the driving speed of said turbine wheel, said spacer means having an enlarged medial recess and said shaft having a boss extending into said recess and rotatable therein, said boss operative to assist the circulation flow of lubricant toward said bearings, said boss constituting a paramagnetic material, magnetic field producing means adjacent said recess and circuit means including conductor means to receive a signal upon rotation of said boss relative to said field producing means and signal responsive speed regulating means for said turbine wheel.

5. A turbine pump assembly comprising a hollow casing, a pair of spaced apart bearings in said casing, a shaft journaled in said bearings, a pump impeller at one end of said shaft, a turbine wheel at the other end of said shaft to drive said impeller, seal means closing each end of said casing, a charge of lubricant prepacked in said casing, spacer means between said bearings forming together with said shaft a restricted flow path between said bearings, the circulation flow of lubricant through and between said bearings being responsive to the driving speed of said turbine wheel, said spacer means having an enlarged medial recess and said shaft having a boss extending into said recess and rotatable therein, said boss operative to assist the circulation flow of lubricant toward said bearings, said boss constituting a paramagnetic material, magnetic field producing means adjacent said recess, conductor means to receive a signal upon rotation of said boss relative to said field producing means, and control means to regulate the speed of said driving means, said control means being adapted to be regulated in response to variations in the signal carried by said conductor means.

6. In a pump assembly, a housing having bearing means therein, a shaft journaled in said bearing means, a pump impeller on said shaft, a turbine wheel on said shaft to drive said impeller, at least a portion of said shaft comprising a radially extending segmental projection made of a paramagnetic material and magnetic field producing means in said housing arranged to establish a magnetic field through which said projection is rotated by said shaft and a control means to receive a signal from said field producing means and to control said turbine in response to variations in said signal.

7. In a pump assembly, a housing having a hollow bore extending therethrough, a shaft extending through said bore having a pump impeller at one end and a turbine wheel at the other end, a first seal between the impeller end of said shaft and said housing, a second seal between the wheel end of said shaft and said housing, a pair of spaced apart bearings in said housing between said first and second seals, each of said bearings having angularly disposed raceways cooperable with shiftable ball elements to resist axial and radial forces, a resilient means to pre-load said bearings axially, a spacer ring between said bearings forming together with said shaft a restricted passageway and means in said housing providing a filling inlet to pack said housing with lubricant between said seals, the circulation flow of lubricant between said bearings being responsive to the rotational speed of said shaft.

8. In a pump assembly, a housing having a hollow bore extending therethrough, a shaft extending through said bore having a pump impeller at one end and a turbine wheel at the other end, a first seal between the impeller end of said shaft and said housing, a second seal between the wheel end of said shaft and said housing, a pair of spaced apart bearings in said housing between said first and second seals, each of said bearings having angularly disposed raceways cooperable with shiftable ball elements to resist axial and radial forces, a resilient means to preload said bearings axially, a spacer ring between said bearings forming together with said shaft a restricted passageway and means in said housing providing a filling inlet to pack said housing with lubricant between said seals, the circulation flow of lubricant between said bearings being responsive to the rotational speed of said shaft, said spacer ring having an annular recess formed therein, magnetic field producing means arranged to establish a magnetic field in at least a portion of said recess, means co-rotatably carried by said shaft for movement through said field to produce a signal responsive to the rotational speed of said shaft, and control means to control the speed of said turbine wheel in response to variations in said signal.

9. In a pump assembly, a housing having a hollow bore extending therethrough, a shaft extending through said bore having a pump impeller at one end and a turbine wheel at the other end, a first seal between the impeller end of said shaft and said housing, a second seal between the wheel end of said shaft and said housing, a pair of spaced apart bearings in said housing between said first and second seals, each of said bearings having angularly disposed raceways cooperable with shiftable ball elements to resist axial and radial forces, a resilient means to pre-load said bearings axially, a spacer ring between said bearings forming together with said shaft a restricted passageway and means in said housing providing a filling inlet to pack said housing with lubricant between said seals, the circulation flow of lubricant between said bearings being responsive to the rotational speed of said shaft, said spacer ring having an annular recess formed therein, magnetic field producing means arranged to establish a magnetic field in at least a portion of said recess, means co-rotatably carried by said shaft for movement through said field to produce a signal responsive to the rotational speed of said shaft, and control means to control the speed of said turbine wheel in response to variations in said signal, said shaft carried means comprising an impeller to assist in the circulation of lubricant through said passageway toward said bearings.

10. A turbine pump assembly comprising a hollow casing, a pair of spaced apart bearings in said casing, a shaft journalled in said bearings, a turbine wheel at one end of said shaft to rotate said shaft, a pump impeller on the other end of said shaft, spacer means between said bearings and surrounding said shaft, said spacer means together with said shaft forming a restricted passageway, seal means at each end of said shaft to close said casing at the impeller end thereof and at the wheel end thereof, said hollow casing adapted to be pre-packed with a lubricant, and a boss on said shaft rotatable in said passageway to promote a flow of lubricant through said passageway toward said bearings.

11. A turbine pump assembly comprising a hollow casing, a pair of spaced apart bearings in said casing, a shaft journalled in said bearing, a pump impeller at one end of said shaft, a turbine wheel at the other end of said shaft to drive said impeller, seal means closing each end of said casing, a charge of thermotropic lubricant pre-packed in said casing to surround said bearings and corresponding portions of the shaft in the vicinity of said bearings, and spacer means between said bearings forming together with said shaft a restricted flow path between said bearings, the circulation flow of lubricant through and between said bearings being thermotropically responsive to the driving speed of said turbine wheel, rotation of said shaft acting upon the lubricant deposited thereon to produce thermotropic variations therein proportional to the driving speed of said turbine wheel.

12. In a pump assembly, a housing having a hollow bore, a pair of spaced bearings in said bore, a shaft journalled in said bearings, a centrally recessed nozzle ring carried at one end of said housing and providing an annular row of circumferentially spaced nozzles, a turbine wheel adjacent said nozzle ring and having an annular row of circumferentially spaced vanes registering with said nozzles and mounted for co-rotation with said shaft, a retainer bushing in the centrally recessed portion of said nozzle ring and closely surrounding said shaft, said retainer bushing being made of a porous material prepacked with a lubricant, and means in said nozzle ring forming a filling inlet communicating with said centrally recessed portion and with said bore, said retainer bushing together with said shaft and said nozzle ring closing the end of said bore, whereby a supply of lubricant may be packed in said bore.

13. In a pump assembly having a pumping impeller and a driving means co-rotatably connected with one another, the improvement of a pump housing, bearing means in said housing, a shaft journalled in said bearing means and adapted to be connected with said pumping impeller and with said driving means, magnetic field producing means in said housing providing an annular magnetic field around the shaft, a boss on said shaft made of magnetizable material and rotatable in said field to generate a signal upon rotation of said shaft, and circuit means receiving said signal and including speed regulating means for said driving means controlled in response to variations in said signal.

14. In a pump assembly, a housing having a hollow bore extending therethrough, a shaft extending through said bore having a pump impeller at one end and a turbine wheel at the other end, a first seal between the impeller end of such shaft and said housing, a second seal between the wheel end of said shaft and said housing, a pair of spaced apart bearings in said housing between said first and second seal, each of said bearings having angularly disposed raceways cooperable with shiftable ball elements to resist axial and radial forces, means providing an annular recess adjacent the raceway of one of said bearings, and a spring member in said recess acting between said housing and said one bearing to pre-load both of said bearings axially, comprising, an annular ring of metal shaped to provide a main body portion and a plurality of circumferentially spaced tabs bent back upon the main body portion to form a V-shaped recess with the outer edges of said tabs and said main body portion resiliently engaging adjoining surfaces of said one bearing and said housing.

References Cited in the file of this patent

UNITED STATES PATENTS

| | | |
|---|---|---|
| 915,214 | Pfau | Mar. 16, 1909 |
| 993,616 | Orten-Boving | May 30, 1911 |
| 1,109,209 | Doble | Sept. 1, 1914 |
| 1,827,811 | Derrick | Oct. 20, 1931 |
| 2,247,449 | Neeson | July 1, 1941 |
| 2,274,337 | Ritter | Feb. 24, 1942 |
| 2,296,640 | Hansen | Sept. 22, 1942 |
| 2,427,638 | Vilter et al. | Sept. 16, 1947 |
| 2,454,038 | Crever | Nov. 16, 1948 |
| 2,492,672 | Wood | Dec. 27, 1949 |
| 2,512,438 | Ranzi | June 20, 1950 |
| 2,577,134 | Land | Dec. 4, 1951 |